US007899167B1

(12) United States Patent
Rae

(10) Patent No.: US 7,899,167 B1
(45) Date of Patent: Mar. 1, 2011

(54) CENTRALIZED CALL PROCESSING

(75) Inventor: Robert L. Rae, Plano, TX (US)

(73) Assignee: Securus Technologies, Inc., Dallas, TX (US)

( * ) Notice: Subject to any disclaimer, the term of this patent is extended or adjusted under 35 U.S.C. 154(b) by 1456 days.

(21) Appl. No.: 10/642,532

(22) Filed: Aug. 15, 2003

(51) Int. Cl.
*H04M 3/00* (2006.01)

(52) U.S. Cl. .................. 379/189; 379/32.01; 379/35; 379/188; 379/207.01; 370/260; 370/261; 370/401; 370/352

(58) Field of Classification Search .................. 455/411; 379/188, 189, 32.01, 35, 207.01; 370/260, 370/261, 401, 352
See application file for complete search history.

(56) References Cited

U.S. PATENT DOCUMENTS

| | | | |
|---|---|---|---|
| 3,096,404 A | 7/1963 | Semon | |
| 3,113,185 A | 12/1963 | Semon | |
| 3,350,515 A | 10/1967 | Semon | |
| 3,397,288 A | 8/1968 | Semon | |
| 3,398,288 A | 8/1968 | Sanders et al. | |
| 3,626,107 A | 12/1971 | Armstrong et al. | |
| 3,660,610 A | 5/1972 | Hestad et al. | |
| 3,676,605 A | 7/1972 | Johnson | |
| 3,798,382 A | 3/1974 | Hoven | |
| 3,813,495 A | 5/1974 | Conerly | |
| 3,829,617 A | 8/1974 | Caithamer et al. | |
| 3,851,121 A | 11/1974 | Marvin | |
| 3,864,519 A | 2/1975 | Owen | |
| 3,952,160 A | 4/1976 | Pasternack et al. | |
| 3,985,956 A | 10/1976 | Monti et al. | |
| 3,997,731 A | 12/1976 | Wilmot et al. | |
| 4,001,513 A | 1/1977 | Naylor | |

(Continued)

FOREIGN PATENT DOCUMENTS

EP  0185365 A1  6/1986

(Continued)

OTHER PUBLICATIONS

"SciDyn VoIP Technology Now Available for Call Control Solutions", SciDyn™ Press Release, [online] [Retrieved on Nov. 4, 2005] Retrieved from: http://www.scidyn.com/news/pr/0122pr.html.

(Continued)

*Primary Examiner*—Ahmad F Matar
*Assistant Examiner*—Antim Shah
(74) *Attorney, Agent, or Firm*—Fenwick & West LLP

(57) ABSTRACT

Disclosed are systems and methods which provide a centralized architecture for call processing. Embodiments utilize voice over Internet protocols (VoIP) to carry calls from a location at which calling services are provided to a centralized call processing platform providing call processing functionality, such as calling party identification, call validation, call routing, and connection to the public switched telephone network (PSTN). Call processing gateways may be utilized to provide plain old telephone service (POTS) analog line interfaces for use with a plurality of telephone sets disposed for use at a location and at least one wide area network (WAN) interface for providing high speed data communication to a centralized call processing platform. PSTN interfacing by a call processing platform may be provided as a VoIP connection to the PSTN and/or as POTS trunking. Call processing platforms may provide for data sharing, aggregation, and/or analysis across multiple facilities served.

21 Claims, 2 Drawing Sheets

U.S. PATENT DOCUMENTS

| | | |
|---|---|---|
| 4,002,848 A | 1/1977 | Stein |
| 4,027,109 A | 5/1977 | Smith et al. |
| 4,054,756 A | 10/1977 | Comella et al. |
| 4,055,730 A | 10/1977 | Stapleford et al. |
| 4,122,308 A | 10/1978 | Weinberger et al. |
| 4,156,799 A | 5/1979 | Cave |
| 4,188,508 A | 2/1980 | Rogers et al. |
| 4,196,317 A | 4/1980 | Bartelink |
| 4,310,726 A | 1/1982 | Asmuth |
| 4,319,091 A | 3/1982 | Meri |
| 4,326,123 A | 4/1982 | Hosterman |
| 4,333,056 A | 6/1982 | Cave |
| 4,371,752 A | 2/1983 | Matthews et al. |
| 4,387,274 A | 6/1983 | Stein et al. |
| 4,405,833 A | 9/1983 | Cave et al. |
| 4,439,636 A | 3/1984 | Newkirk et al. |
| 4,445,211 A | 4/1984 | Webber |
| 4,477,698 A | 10/1984 | Szlam et al. |
| 4,518,825 A | 5/1985 | Brinkerhoff et al. |
| 4,538,030 A | 8/1985 | Fossett et al. |
| 4,540,855 A | 9/1985 | Szlam et al. |
| 4,552,996 A | 11/1985 | de Bergh |
| 4,559,416 A | 12/1985 | Theis et al. |
| 4,585,904 A | 4/1986 | Mincone et al. |
| 4,593,157 A | 6/1986 | Usdan |
| 4,595,983 A | 6/1986 | Gehalo et al. |
| 4,602,129 A | 7/1986 | Matthews et al. |
| 4,626,630 A | 12/1986 | Waldman |
| 4,629,829 A | 12/1986 | Puhl et al. |
| 4,644,109 A | 2/1987 | Takeda et al. |
| 4,686,699 A | 8/1987 | Wilkie |
| 4,696,028 A | 9/1987 | Morganstein et al. |
| 4,696,031 A | 9/1987 | Freudberg et al. |
| 4,698,840 A | 10/1987 | Dively et al. |
| 4,712,230 A | 12/1987 | Rice et al. |
| 4,723,273 A | 2/1988 | Diesel et al. |
| 4,726,057 A | 2/1988 | Doerry et al. |
| 4,727,577 A | 2/1988 | Frey et al. |
| 4,731,818 A | 3/1988 | Clark, Jr. et al. |
| 4,736,405 A | 4/1988 | Akiyama |
| 4,737,982 A | 4/1988 | Boratgis et al. |
| 4,746,786 A | 5/1988 | Heberle et al. |
| 4,763,350 A | 8/1988 | Immendorfer et al. |
| 4,766,604 A | 8/1988 | Axberg |
| 4,768,223 A | 8/1988 | Kinoshita et al. |
| 4,768,227 A | 8/1988 | Dively et al. |
| 4,769,834 A | 9/1988 | Billinger et al. |
| 4,777,647 A | 10/1988 | Smith et al. |
| 4,782,516 A | 11/1988 | Maybach et al. |
| 4,791,640 A | 12/1988 | Sand |
| 4,794,642 A | 12/1988 | Arbabzadah et al. |
| 4,797,910 A | 1/1989 | Daudelin |
| 4,799,255 A | 1/1989 | Billinger et al. |
| 4,802,207 A | 1/1989 | Uchida |
| 4,803,718 A | 2/1989 | Neil et al. |
| 4,815,120 A | 3/1989 | Kosich |
| 4,825,460 A | 4/1989 | Carter et al. |
| 4,839,917 A | 6/1989 | Oliver |
| 4,850,011 A | 7/1989 | Delmege et al. |
| 4,868,873 A | 9/1989 | Kamil |
| 4,885,765 A | 12/1989 | Shirakawa |
| 4,890,317 A | 12/1989 | Hird et al. |
| 4,896,348 A | 1/1990 | Grantland et al. |
| 4,899,358 A | 2/1990 | Blakley |
| 4,899,375 A | 2/1990 | Bauer et al. |
| 4,901,341 A | 2/1990 | Carter et al. |
| 4,908,852 A | 3/1990 | Hird et al. |
| 4,916,733 A | 4/1990 | Smith et al. |
| 4,920,562 A | 4/1990 | Hird et al. |
| 4,922,519 A | 5/1990 | Daudelin |
| 4,922,520 A | 5/1990 | Bernard et al. |
| 4,924,488 A | 5/1990 | Kosich |
| 4,924,501 A | 5/1990 | Cheeseman et al. |
| 4,932,062 A | 6/1990 | Hamilton |
| 4,933,966 A | 6/1990 | Hird et al. |
| 4,933,967 A | 6/1990 | Lo et al. |
| 4,935,956 A | 6/1990 | Hellwarth et al. |
| 4,937,856 A | 6/1990 | Natarajan |
| 4,937,862 A | 6/1990 | Kosich |
| 4,943,995 A | 7/1990 | Daudelin et al. |
| 4,944,001 A | 7/1990 | Kizuik et al. |
| 4,947,422 A | 8/1990 | Smith et al. |
| 4,947,425 A | 8/1990 | Grizmala et al. |
| 4,979,214 A | 12/1990 | Hamilton |
| 4,991,203 A | 2/1991 | Kakizawa |
| 4,993,062 A | 2/1991 | Dula et al. |
| 4,993,068 A | 2/1991 | Piosenka et al. |
| 5,003,595 A | 3/1991 | Collins et al. |
| 5,008,923 A | 4/1991 | Kitamura et al. |
| 5,020,095 A | 5/1991 | Morganstein et al. |
| 5,022,067 A | 6/1991 | Hughes |
| 5,023,869 A | 6/1991 | Grover et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,093,858 A | 3/1992 | Hird et al. |
| 5,109,405 A | 4/1992 | Morganstein |
| 5,131,024 A | 7/1992 | Pugh et al. |
| 5,134,651 A | 7/1992 | Ortiz et al. |
| 5,150,357 A | 9/1992 | Hopner et al. |
| 5,153,907 A | 10/1992 | Pugh et al. |
| 5,155,761 A | 10/1992 | Hammond |
| 5,163,083 A | 11/1992 | Dowden et al. |
| 5,164,989 A | 11/1992 | Brandman et al. |
| 5,181,237 A | 1/1993 | Dowden et al. |
| 5,187,740 A | 2/1993 | Swaim et al. |
| 5,193,110 A | 3/1993 | Jones et al. |
| 5,200,995 A | 4/1993 | Gaukel et al. |
| 5,210,789 A | 5/1993 | Jeffus et al. |
| 5,216,702 A | 6/1993 | Ramsden |
| 5,218,636 A | 6/1993 | Hamilton |
| 5,220,501 A | 6/1993 | Lawlor et al. |
| 5,222,120 A | 6/1993 | McLeod et al. |
| 5,229,764 A | 7/1993 | Matchett et al. |
| 5,247,569 A | 9/1993 | Cave |
| 5,255,305 A | 10/1993 | Sattar |
| 5,274,698 A | 12/1993 | Jang |
| 5,276,731 A | 1/1994 | Arbel et al. |
| 5,283,825 A | 2/1994 | Druckman et al. |
| 5,283,829 A | 2/1994 | Anderson |
| 5,287,401 A | 2/1994 | Lin |
| 5,305,312 A | 4/1994 | Fornek et al. |
| 5,309,505 A | 5/1994 | Szlam et al. |
| 5,311,589 A | 5/1994 | Bennett et al. |
| 5,319,701 A | 6/1994 | Hird et al. |
| 5,319,702 A | 6/1994 | Kitchin et al. |
| 5,321,754 A | 6/1994 | Fisher et al. |
| 5,323,448 A | 6/1994 | Biggs et al. |
| 5,325,421 A | 6/1994 | Hou et al. |
| 5,325,427 A | 6/1994 | Dighe |
| 5,327,489 A | 7/1994 | Anderson et al. |
| 5,329,578 A | 7/1994 | Brennan et al. |
| 5,333,181 A | 7/1994 | Biggs |
| 5,335,266 A | 8/1994 | Richardson, Jr. et al. |
| 5,345,501 A | 9/1994 | Shelton |
| 5,345,595 A | 9/1994 | Johnson et al. |
| 5,351,285 A | 9/1994 | Katz |
| 5,351,287 A | 9/1994 | Bhattacharyya et al. |
| 5,355,403 A | 10/1994 | Richardson, Jr. et al. |
| 5,369,699 A | 11/1994 | Page et al. |
| 5,375,161 A | 12/1994 | Fuller et al. |
| 5,381,474 A | 1/1995 | Lahdemaki et al. |
| 5,394,465 A | 2/1995 | Jo |

| | | | | | | |
|---|---|---|---|---|---|---|
| 5,416,831 | A | 5/1995 | Chewning, III et al. | 6,324,280 B2 | 11/2001 | Dunn et al. |
| 5,425,087 | A | 6/1995 | Gerber et al. | 6,363,065 B1 | 3/2002 | Thornton et al. |
| 5,428,662 | A | 6/1995 | Hamilton | 6,366,653 B1 | 4/2002 | Yeh et al. |
| 5,442,696 | A | 8/1995 | Lindberg et al. | 6,381,321 B1 | 4/2002 | Brown et al. |
| 5,450,485 | A | 9/1995 | Hamilton | 6,404,764 B1 | 6/2002 | Jones et al. |
| 5,452,347 | A | 9/1995 | Iglehart et al. | 6,404,857 B1 | 6/2002 | Blair et al. |
| 5,455,819 | A | 10/1995 | Sugiyama | 6,404,870 B1 | 6/2002 | Kia |
| 5,461,665 | A | 10/1995 | Shur et al. | 6,445,682 B1 | 9/2002 | Weitz |
| 5,465,293 | A | 11/1995 | Chiller et al. | 6,480,590 B1 | 11/2002 | Ku |
| 5,465,387 | A | 11/1995 | Mukherjee | 6,487,200 B1 | 11/2002 | Fraser |
| 5,471,519 | A | 11/1995 | Howe et al. | 6,496,477 B1 | 12/2002 | Perkins et al. |
| 5,473,686 | A | 12/1995 | Virdee | 6,529,500 B1 | 3/2003 | Pandharipande |
| 5,483,582 | A | 1/1996 | Pugh et al. | 6,529,602 B1 | 3/2003 | Walker et al. |
| 5,483,593 | A | 1/1996 | Gupta et al. | 6,553,336 B1 | 4/2003 | Johnson et al. |
| 5,485,507 | A | 1/1996 | Brown et al. | 6,560,323 B2 | 5/2003 | Gainsboro |
| 5,497,414 | A | 3/1996 | Bartholomew | 6,560,325 B2 | 5/2003 | Brown et al. |
| 5,504,810 | A | 4/1996 | McNair | 6,611,583 B1 | 8/2003 | Gainsboro |
| 5,524,141 | A | 6/1996 | Braun et al. | 6,621,812 B1 | 9/2003 | Chapman et al. |
| 5,524,145 | A | 6/1996 | Parker | 6,654,722 B1 | 11/2003 | Aldous et al. |
| 5,535,261 | A | 7/1996 | Brown et al. | 6,665,380 B1 | 12/2003 | Cree et al. |
| 5,539,812 | A | 7/1996 | Kitchin et al. | 6,687,360 B2 | 2/2004 | Kung et al. |
| 5,544,231 | A | 8/1996 | Cho | 6,731,630 B1 | 5/2004 | Schuster et al. |
| 5,566,229 | A | 10/1996 | Hou et al. | 6,788,775 B1 | 9/2004 | Simpson |
| 5,577,116 | A | 11/1996 | Townsend et al. | 6,795,444 B1 | 9/2004 | Vo et al. |
| 5,583,920 | A | 12/1996 | Wheeler, Jr. | 6,816,469 B1 | 11/2004 | Kung et al. |
| 5,583,934 | A | 12/1996 | Zhou | 6,876,647 B2 | 4/2005 | Celi, Jr. |
| 5,606,604 | A | 2/1997 | Rosenblatt et al. | 6,904,139 B2 | 6/2005 | Brown et al. |
| 5,617,471 | A | 4/1997 | Rogers et al. | 6,920,209 B1 | 7/2005 | Gainsboro |
| 5,619,561 | A | 4/1997 | Reese | 6,985,478 B2 * | 1/2006 | Pogossiants et al. ......... 370/352 |
| 5,627,887 | A | 5/1997 | Freedman | 7,039,171 B2 | 5/2006 | Gickler |
| 5,634,126 | A | 5/1997 | Norell | 7,042,992 B1 | 5/2006 | Falcone et al. |
| 5,651,056 | A | 7/1997 | Eting et al. | 7,046,782 B2 | 5/2006 | Miller |
| 5,655,013 | A | 8/1997 | Gainsboro | 7,075,922 B2 | 7/2006 | Mussman et al. |
| 5,682,386 | A | 10/1997 | Arimilli et al. | 7,085,359 B2 | 8/2006 | Crites et al. |
| 5,722,418 | A | 3/1998 | Bro | 7,203,186 B1 | 4/2007 | Fuller et al. |
| 5,724,404 | A | 3/1998 | Garcia et al. | 7,302,053 B2 | 11/2007 | Chang et al. |
| 5,742,905 | A | 4/1998 | Pepe et al. | 7,333,798 B2 * | 2/2008 | Hodge ........................ 455/411 |
| 5,745,553 | A | 4/1998 | Mirville et al. | 7,360,087 B2 | 4/2008 | Jorgensen et al. |
| 5,745,558 | A | 4/1998 | Richardson, Jr. et al. | 7,360,090 B1 | 4/2008 | Doskow et al. |
| 5,757,781 | A | 5/1998 | Gilman et al. | 7,505,406 B1 * | 3/2009 | Spadaro et al. .......... 370/230.1 |
| 5,768,355 | A | 6/1998 | Salibrici et al. | 2001/0028649 A1 | 10/2001 | Pogossiants et al. |
| 5,777,558 | A | 7/1998 | Pennypacker et al. | 2001/0036821 A1 | 11/2001 | Gainsboro et al. |
| 5,796,811 | A | 8/1998 | McFarlen | 2001/0041590 A1 | 11/2001 | Silberfenig et al. |
| 5,799,068 | A | 8/1998 | Kikinis et al. | 2001/0047333 A1 | 11/2001 | Kim et al. |
| 5,805,685 | A | 9/1998 | McFarlen | 2002/0071537 A1 | 6/2002 | Gainsboro |
| 5,809,125 | A | 9/1998 | Gammino | 2002/0141386 A1 | 10/2002 | Minert et al. |
| 5,844,978 | A | 12/1998 | Reuss et al. | 2002/0159440 A1 | 10/2002 | Mussman et al. |
| 5,859,907 | A | 1/1999 | Kawahara et al. | 2002/0176403 A1 | 11/2002 | Radian |
| 5,862,519 | A | 1/1999 | Sharma et al. | 2003/0002639 A1 | 1/2003 | Huie |
| 5,867,559 | A | 2/1999 | Jorgensen et al. | 2003/0023714 A1 | 1/2003 | Ziegler et al. |
| 5,875,230 | A | 2/1999 | Ganley et al. | 2003/0091028 A1 * | 5/2003 | Chang et al. ................ 370/352 |
| 5,883,945 | A * | 3/1999 | Richardson et al. ......... 379/189 | 2003/0126470 A1 * | 7/2003 | Crites et al. ................ 713/201 |
| 5,907,602 | A | 5/1999 | Peel et al. | 2003/0133558 A1 | 7/2003 | Kung et al. |
| 5,923,746 | A | 7/1999 | Baker et al. | 2003/0185204 A1 | 10/2003 | Murdock |
| 5,926,533 | A | 7/1999 | Gainsboro | 2004/0052218 A1 * | 3/2004 | Knappe ...................... 370/260 |
| 5,937,042 | A | 8/1999 | Sofman | 2006/0209797 A1 | 9/2006 | Anisimov et al. |
| 5,943,403 | A | 8/1999 | Richardson, Jr. et al. | 2006/0285650 A1 | 12/2006 | Hodge |
| 5,946,386 | A | 8/1999 | Rogers et al. | 2006/0286962 A1 | 12/2006 | Davis |
| 5,960,064 | A | 9/1999 | Foladare et al. | 2007/0041545 A1 * | 2/2007 | Gainsboro .................. 379/188 |
| 6,031,895 | A | 2/2000 | Cohn et al. | 2007/0071206 A1 | 3/2007 | Gainsboro et al. |
| 6,052,454 | A | 4/2000 | Kek et al. | 2007/0115924 A1 | 5/2007 | Schneider et al. |
| 6,064,963 | A | 5/2000 | Gainsboro | 2007/0242658 A1 | 10/2007 | Rae et al. |
| 6,072,860 | A | 6/2000 | Kek et al. | 2007/0263812 A1 | 11/2007 | Polozola et al. |
| 6,075,843 | A | 6/2000 | Cave | 2008/0040780 A1 | 2/2008 | Reinhold |
| 6,097,804 | A | 8/2000 | Gilbert et al. | | | |
| 6,134,320 | A | 10/2000 | Swan et al. | | | |
| 6,141,406 | A | 10/2000 | Johnson | | | |

FOREIGN PATENT DOCUMENTS

| | | |
|---|---|---|
| 6,169,789 B1 | 1/2001 | Rao et al. |
| RE37,073 E | 2/2001 | Hammond |
| 6,188,751 B1 | 2/2001 | Scherer |
| 6,249,570 B1 | 6/2001 | Glowny et al. |
| 6,320,946 B1 | 11/2001 | Enzmann |
| 6,320,948 B1 * | 11/2001 | Heilmann et al. ........... 379/189 |

| | | |
|---|---|---|
| EP | 0814583 A2 | 12/1997 |
| EP | 1 175 074 | 1/2002 |
| FR | 2600850 | 12/1987 |
| GB | 2134749 A | 8/1984 |
| JP | 5-30193 | 2/1993 |
| JP | 63-03305 | 10/1994 |

| | | |
|---|---|---|
| JP | 63-033054 | 12/1994 |
| JP | 2002157627 | 4/2003 |
| JP | 2003110758 A | 4/2003 |
| WO | WO 96/20448 A1 | 7/1996 |
| WO | WO 97/22208 A2 | 6/1997 |
| WO | WO 98/13993 A1 | 4/1998 |
| WO | WO 00/54491 A1 | 9/2000 |

OTHER PUBLICATIONS

"Call Control—Commander II:", SciDyn™ Products, [online] [Retrieved on Nov. 4, 2005] Retrieved from http://www.scidyn.com/products/commander2.html.

"Smart Features for Optimizing Your Network", SciDyn™ BubbleLINK®, [online] [Retrieved on Nov. 4, 2005] Retrieved from: http://www.scidyn.com/products/bubble.html.

"BubbleLINK® Software Architecture", SciDyn™, The Voice of IP Technology™, [online] [Retrieved on Nov. 4, 2005] Retrieved from: http://www.scidyn.com/products/BubbleLink%20White.pdf.

"ShoreTel- Intelligent Phone Systems", ShoreTel, [online] [Retrieved on Nov. 4, 2005] Retrieved from: http://www.shoretel.com/STCorp/products/architecture.aspx.

Bobb Swope et al., U.S. Appl. No. 09/640,831, entitled "System and Method For Reverse Billing of a Telephone Call," filed Aug. 17, 2000.

Michael Lord, U.S. Appl. No. 09/955,253, entitled "Method and Apparatus for Exchanging Data Between a Primary Computer System and an External Computer System to Ensure Transactional Reconciliation Between the Systems," filed Nov. 27, 2001.

Nadia Draizin et al., U.S. Appl. No. 10/022,946, entitled "A Method for Determining an Entity Responsible for Billing a Called Party," filed Dec. 17, 2001.

John J. Viola et al., U.S. Appl. No. 10/135,878, entitled "Information Management and Movement System and Method," filed Apr. 29, 2002.

Richard Falcone et al., U.S. Appl. No. 10/190,315, entitled "Systems and Methods for Offering a Service to a Party Associated With a Blocked Call," filed Jul. 3, 2002.

Michael Lord, U.S. Appl. No. 10/252,956, entitled "Three-Way Telephone Call Prevention System and Method," filed Sep. 20, 2002.

Dick Falcone et al., U.S. Appl. No. 10/135,883, entitled "Optimizing Profitability in Business Transactions," filed Nov. 25, 2003.

Marc Hite at el., U.S. Appl. No. 10/437,839, entitled "Intelligent Queuing of Transaction Records," filed May 14, 2003.

Richard Falcone et al., U.S. Appl. No. 10/360,248, entitled "Systems and Methods for Account Establishment and Transaction Management Using Interrupt Messaging," filed Feb. 7, 2003.

Richard Falcone, et al., U.S. Appl. No. 10/360,442 entitled "Systems and Methods for Transaction Authorization Determination," filed Feb. 7, 2003.

George McNitt et al., U.S. Appl. No. 10/420,585, entitled System and Method for Detecting Unauthorized Call Activity.

Anderson, Susan, "Three-Way Call Detect . . . Close Enough to Perfect?" Correctional Communications Quarterly, pp. 16-20, Oct. 1993.

Bahl, L. "A Maximum Likelihood Approach to Continuous Speech Recovery," Readings in Speech Recognition, Ed. A. Waibel and K. Lee, Morgan Kaufmann Publishers, pp. 308-319, IEEE 1983.

Batten, A. "Personal Communications Service and the Intelligent Network," British Telecommunications Engineering, vol. 9, pp. 88-91, Aug. 1990.

DPD/120-JP Product on Display at Communications Tokyo '01, Apr. 2-5, 1991 (Product described in U.S. Patent No. 5,218,636).

European Examination Report, EP07251570.3, May 29, 2008, 5 pages.

Exhibits A-N, Various materials compiled by Applicants.

HR Solutions, http://www.solutions.hrd.com/methods_of_electronic_monitoring.htm, p. 4 of 5, Telephone Surveillance.

Jones International, http://www.jonesencyclo.com/encyclo/update/ecpa.html, 1-7, Electronic Communications Privacy Act.

LazerVoice, Digital Recording System Inmate Services, 1997-1998, Schlumberger Technologies, Inc. / LazerVoice STIL V0222

LazerVoice User's Manual—Version 2.22, pp. 1-41, published Apr. 28, 1998 by Schlumberger Technologies, Inc./LazerVoice of Mobile, Alabama.

"LazerPhone User Reference Manual," 150 pages, edition and publisher unknown.

"LazerPhone Inmate Telephone System, Users Manual version 1.0," pp. 1-29, published Oct. 1998 by Schlumberger Technologies, Inc./Global Tel*Link of Mobile, Alabama.

LazerPhone, Powerful Performance Uncompromising Standards, 1998.

LazerPhone Technical Manual, "Chapter I. System Overview," pp. 1.1-1.6, published by Schlumberger Technologies, Inc. of Mobile, Alabama.

Lee, K., "Large-Vocabulary Speaker-Independent Continuous Speech Recognition Using HMM," Carnegie Mellon University Department of Electrical and Computer Engineering, CMU-CS-88-148, Apr. 1988.

Manual for "DPD/120-JP Dial Pulse Detection Board," Dialogic Systems Ltd., Tokyo, Japan, (Product described in U.S. Patent No. 5,218,636), undated.

OSSGR, vol. 3, "Feature Specific Documents," Technical Ref. TSY-000271 FSD 85-01-0100 Calling Card Service—Published by Bell Communications Research-Revision #3, Dated Mar. 1988.

OSSGR, vol. 3, "Feature Specific Documents," Technical Ref. TSY-000271 FSD-85-01-0200 Collect Billing-Published by Bell Communications Research-Revision #3 Dated Mar. 1988.

PCT International Search Report, PCT/US99/09493, Aug. 20, 1999, 5 pages.

PCT Written Opinion, PCT/US99/09493, Feb. 9, 2000, 12 pages.

"PPCS (Prison Prepaid Card System)", DiaVox Technologies, Inc., Nov. 2000, 10 pages.

Scidyn Commander 3-Way Call Detection System [online] [Retrieved on Jun. 20, 2006] Retrieved from: http://www.scidyn.com/products/Commander%203-way%20Detection.pdf, 5 pages.

"System 20" Value Added Communications (VAC), Nov. 1992, Brochure (4 pages).

Telematic "ConQuest III Inmate Telephone System," Nov. 1992.

Thermos, P., "Two Attacks Against VoIP," Security Focus, XP-002444627, Apr. 4, 2006, pp. 1-8.

U.S. Appl. No. 09/229,385, Cree et al., filed Jan. 1999 (Reference not included).

U.S. Appl. No. 11/777,168, Rae et al., Entitled "Inmate Management and Call Processing Systems and Methods," filed Jul. 12, 2007 (Reference not included).

U.S. Appl. No. 09/905,014, filed Jul. 13, 2007 (Reference not included).

U.S. Appl. No. 11/403,547, filed Apr. 13, 2006 (Reference not included).

U.S. Appl. No. 10/646,638, filed Aug. 22, 2003 (Reference not inlcuded).

U.S. Appl. No. 10/800,473, filed Mar. 3, 2004 (Reference not included).

"VoIP the Evolving Solution and the Evolving Threat," Internet Security Systems, Inc., XP-002444626, 2004, pp. 1-7.

United States Office Action, U.S. Appl. No. 09/905,014, Apr. 19, 2005, 19 pages.

United States Office Action, U.S. Appl. No. 09/905,014, Jan. 9, 2006, 22 pages.

United States Office Action, U.S. Appl. No. 09/905,014, Sep. 14, 2006, 23 pages.

United States Office Action, U.S. Appl. No. 09/905,014, Mar. 22, 2007, 25 pages.

United States Office Action, U.S. Appl. No. 09/905,014, Sep. 12, 2007, 29 pages.

United States Office Action, U.S. Appl. No. 09/905,014, Mar. 17, 2008, 27 pages.

United States Office Action, U.S. Appl. No. 10/800,473, Nov. 28, 2007, 20 pages.

United States Office Action, U.S. Appl. No. 10/800,473, Sep. 5, 2008, 22 pages.

United States Office Action, U.S. Appl. No. 10/800,473, Apr. 16, 2009, 32 pages.
United States Office Action, U.S. Appl. No. 10/800,473, Mar. 24, 2010, 32 pages.
United States Office Action, U.S. Appl. No. 11/777,168, Apr. 8, 2008, 12 pages.
United States Office Action, U.S. Appl. No. 11/777,168, Oct. 29, 2008, 5 pages.
United States Office Action, U.S. Appl. No. 11/777,168, Nov. 20, 2008, 5 pages.
United States Office Action, U.S. Appl. No. 11/403,547, Dec. 30, 2009, 5 pages.
United States Office Action, U.S. Appl.No. 10/800,473, Aug. 30, 2010, 33 pages.

* cited by examiner

CENTRALIZED CALL PROCESSING

CROSS-REFERENCE TO RELATED APPLICATIONS

The present application is related to co-pending and commonly assigned U.S. patent application Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/190,315 entitled "System and Methods for Offering a Service to a Party Associated with a Blocked Call," filed Jul. 3, 2002, Ser. No. 09/640,831 entitled "System and Method for Reverse Billing of a Telephone Call," filed Aug. 17, 2000, Ser. No. 10/022,946 entitled "Method for Determining an Entity Responsible for Billing a Called Party," filed Dec. 17, 2001, Ser. No. 10/217,149 entitled "System and Method for Call Treatment," filed Aug. 12, 2002, Ser. No. 10/252,956 entitled "Three-Way Telephone Call Prevention System and Method," filed Sep. 20, 2002, Ser. No. 09/995,253 entitled "Method and Apparatus for Exchanging Data Between a Primary Computer System and an External Computer System to Ensure Transaction Reconciliation Between the Systems," filed Nov. 27, 2001, Ser. No. 10/360,248 entitled "System and Method for Account Establishment and Transaction Management Using Interrupt Messaging," filed Feb. 7, 2003, Ser. No. 10/360,442 entitled "Systems and Methods for Transaction Authorization Determination," filed Feb. 7, 2003, Ser. No. 10/437,839 entitled "Intelligent Queuing of Transaction Requests," filed May 14, 2003, and Ser. No. 10/420,585 entitled "System and Method for Detecting Unauthorized Call Activity," filed Apr. 22, 2003, the disclosures of which are hereby incorporated herein by reference.

TECHNICAL FIELD

The present invention relates generally to call processing systems, and more particularly, to a centralized or nodal architecture utilized with respect to call processing.

BACKGROUND OF THE INVENTION

Automated systems for providing call processing functions are not new. For example, U.S. Pat. No. 5,247,569 entitled "System and Method for Controlling Outbound and Inbound Calls in a Telephone Communication System," the disclosure of which is incorporated herein by reference, teaches a call handling system for controlling inbound and outbound calls automatically for placing agents in communication with calling and called parties. U.S. Pat. No. 5,255,305 entitled "Integrated Voice Processing System," the disclosure of which is incorporated herein by reference, teaches a general purpose computer platform providing voice processing functions, including voice messaging, call processing, and interactive voice response. U.S. Pat. No. 4,935,956 entitled "Automated Public Phone Control for Charge and Collect Billing," the disclosure of which is incorporated herein by reference, teaches a microcomputer system for use in automatically controlling charge and collect-call functions. U.S. Pat. No. 6,052,454 entitled "Telephone Apparatus With Recording of Phone Conversations on Massive Storage," the disclosure of which is incorporated herein by reference, teaches a telephone apparatus for providing service to a plurality of telephones located at a particular facility, having the capability of controlling the connection of calls and recording selected phone conversations.

Such call processing systems have typically implemented configurations in which substantial amounts of call processing functionality is disposed or deployed in association with a facility being serviced. For example, discrete and substantially independent call processing systems are disposed at prison facilities, or other facilities, served by the system of above mentioned U.S. Pat. No. 4,935,956. Similarly, although call authorization functionality is disposed remotely to a facility being served in the system of above mentioned U.S. Pat. No. 6,052,454, call processing is provided by the phone system disposed at the facility.

A service provider may have a relatively large number of facilities for which calling services are provided, such as on the order of hundreds or even thousands of individual facilities, perhaps distributed throughout a large geographic area. The aforementioned locally disposed call processing systems provide a number of disadvantages in addition to the equipment costs associated with such a configuration. For example, a large number of call processing systems, particularly when distributed throughout a large geographic area, presents challenges from a maintenance standpoint. When system aspects are modified or updated, such as to provide new rate tables or dialing area codes, each such call processor requires individual attention. For example, an operations, administration, maintenance, and provisioning (OAM&P) terminal may be utilized to establish a dial-up connection with each affected call processor and provide update information and/or reconfiguration. However, merely establishing such dial-up connections with a large number of remote systems is burdensome, even ignoring the time and effort required in actually providing the update. Even where a persistent data link is maintained between such an OAM&P terminal and the remote systems, managing an update of a large number of remote systems is difficult.

Additionally, data sharing, aggregation, and statistical analysis available using such discrete or distributed call processing systems is very limited. The distributed and discrete nature of such previous configurations is not well suited for widespread data sharing, aggregation, and analysis. Moreover, the lack of persistent and/or high bandwidth data connections, such as in the case of the typical dial-up configuration, does not readily facilitate the aggregation of large amounts of data as might otherwise be useful in developing an image across many facilities for which calling services are provided.

Introducing new features and functions in such call processing systems can be problematic. For example, a particular feature requiring a minimum resource configuration or particular hardware may require a significant capital investment to introduce the feature for use at a number of sites as each corresponding call processing system may require hardware upgrades etcetera.

Additional challenges may be presented with respect to use of the aforementioned discrete or distributed call processing systems in particular situations. For example, where such call processing systems are deployed for use with respect to particular controlled environment facilities, such as prison facilities, functionality such as call recording may be implemented. Recording calls typically require substantial recording media space. Accordingly, personnel at each facility, whether employed by the service provider or by the facility itself, is required to periodically, often daily, archive or otherwise refresh the recording media to ensure the continued ability to record calls.

Where such call processing systems are used in providing collect calling or other subsequently billed calling services, discrete or distributed call processing system configurations can present issues with respect to billing and/or risk management. For example, billing records may only be polled periodically, such as by establishing a dial-up connection every night, thereby delaying billing as much as 24 hours with respect to any particular call. Moreover, analysis with respect to call velocity (information with respect to a number of calls placed to or from a particular number over a period of time) and/or credit limits may not be possible until the aforementioned periodic collection of data, allowing calls which otherwise would not be allowed to be completed to continue to be placed during the time of a polling period.

BRIEF SUMMARY OF THE INVENTION

The present invention is directed to systems and methods which provide a centralized architecture for call processing. According to a preferred embodiment of the present invention voice over Internet protocols (VoIP) is utilized to carry calls from a location at which calling services are provided to a centralized call processing platform providing all or substantially all call processing functionality, such as calling party identification, call validation, call routing, connection to the public switched telephone network (PSTN), call recording, etcetera. High bandwidth persistent data connections provided between locations at which calling services are provided and a centralized call processing platform are utilized not only to carry call content as data, but also to provide persistent data links for data processing use, such as by management terminals and/or other data processing systems (e.g., commerce computer systems, justice application management computer systems, various peripheral devices, etcetera) disposed at the facility locations.

Preferred embodiments of the present invention provide devices having relatively limited or specialized functionality, such as VoIP gateways or integrated access devices (IADs) (collectively referred to herein in centralized call processing configurations as call processing gateways), at facility locations for which calling services are provided. These call processing gateways are preferably utilized to provide plain old telephone service (POTS) analog line interfaces for use with a plurality of telephone sets disposed for use at the facility and at least one wide area network (WAN) interface for providing high speed data communication to a centralized call processing platform. Call processing gateways utilized according to the present invention may provide additional interfaces, such as a local area network (LAN) for connecting systems such as management terminals to the gateway and/or centralized call processing platform and/or switched network interfaces such as to couple PSTN lines directly to the gateway, if desired.

Call processing gateways of embodiments of the invention become the collection point for calls and data for a particular facility and provide a link to one or more central sites for call processing and other functionality. For example, one centralized call processing platform may be implemented with respect to a plurality of facilities serviced. Additionally or alternatively, a plurality of call processing platforms, such as might be deployed regionally and/or to provide redundancy, may be networked to a plurality of facilities serviced. WAN circuits may be purchased from a carrier for connecting each individual facility to the call processing platform or platforms. The WAN circuits may be purchased according to the bandwidth capacity desired for each corresponding facility, e.g., to provide less bandwidth where few telephone terminals are deployed at a facility and more bandwidth where many telephone terminals are deployed at another facility. The WAN circuits may be collected together as they proceed through a carrier's network, thereby providing a larger aggregate data pipe or pipes at a centralized call processing platform.

Centralized call processing platforms of preferred embodiments of the present invention comprise high capacity and high speed routing/switching functionality, such as a router and gigabit Ethernet switch, to facilitate low latency data communication between call processing functionality and/or PSTN interfacing functionality of the call processing platform and call processing gateways of a plurality of facilities. Call processing functionality of embodiments of a call processing platform may be provided by a plurality of servers operable under control of instruction sets defining operation to provide call processing features such as calling party identification, call validation, call routing, etcetera. PSTN interfacing functionality of embodiments of a call processing platform may be provided as a data connection (e.g., media gateway control protocol (MGCP) or session initiation protocol (SIP)) to the PSTN. Additionally or alternatively, PSTN interfacing functionality of embodiments of a call processing platform may be provided as POTS trunking or other more traditional telephone line interface. Preferred embodiments, however, may place calls on the PSTN in VoIP protocols to receive the benefit of such advantages as lower connection cost offered by the carrier when introduced to the PSTN in VoIP protocols, reduced latencies associated with repeated conversion of the call between VoIP and analog protocols, and improved call quality associated with carrying the call in digital format closer to the called party before conversion back to analog.

Call processing platforms of the present invention may implement interactive voice response (IVR) features, such as to solicit information from a caller, to provide call status announcements, to solicit funds for a call, etcetera. Additionally or alternatively, call processing platforms of the present invention may implement call recording and/or other centralized data collection, such as through use of a storage area network (SAN), interconnected redundant array of inexpensive disks (RAID) or fixed disk platforms, and/or the like.

Preferred embodiment call processing platforms provide for data sharing, aggregation, and/or analysis across multiple facilities served, whether affiliated (such as facilities of a particular city, county, or state or facilities having an association, e.g., sheriff's association) or non-affiliated (such as all facilities served by the service provider). Accordingly, information, such as inmate booking information, dossiers, etcetera, may be shared across facilities. Similarly, information, such as called party number, uncollectable call statistics, usage frequency or velocity, etcetera, may be aggregated and/or analyzed across facilities.

Call processing platforms of preferred embodiments implement a data structure for segmenting the calling activity for each individual facility to control access with respect to each facility's data and/or to facilitate independent accounting, maintenance, and other functionality, thereby providing, in some respects, a virtual facility call processor with respect to facilities. For example, administrative personnel of a particular facility are preferably enabled to perform maintenance and other operations, e.g., call processor configuration, recorded call playback, billing and commission record access, etcetera, with respect to that particular facility. According to a preferred embodiment, management terminals disposed locally at a facility are provided data access to portions of the call processing platforms relevant to the operation of that facility via the aforementioned call processing gateway, such that it appears from the user's viewpoint as if a local call processor system is being accessed and maintained.

Additionally or alternatively, independent WAN connections with respect to such management terminals may be supported according to embodiments of the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
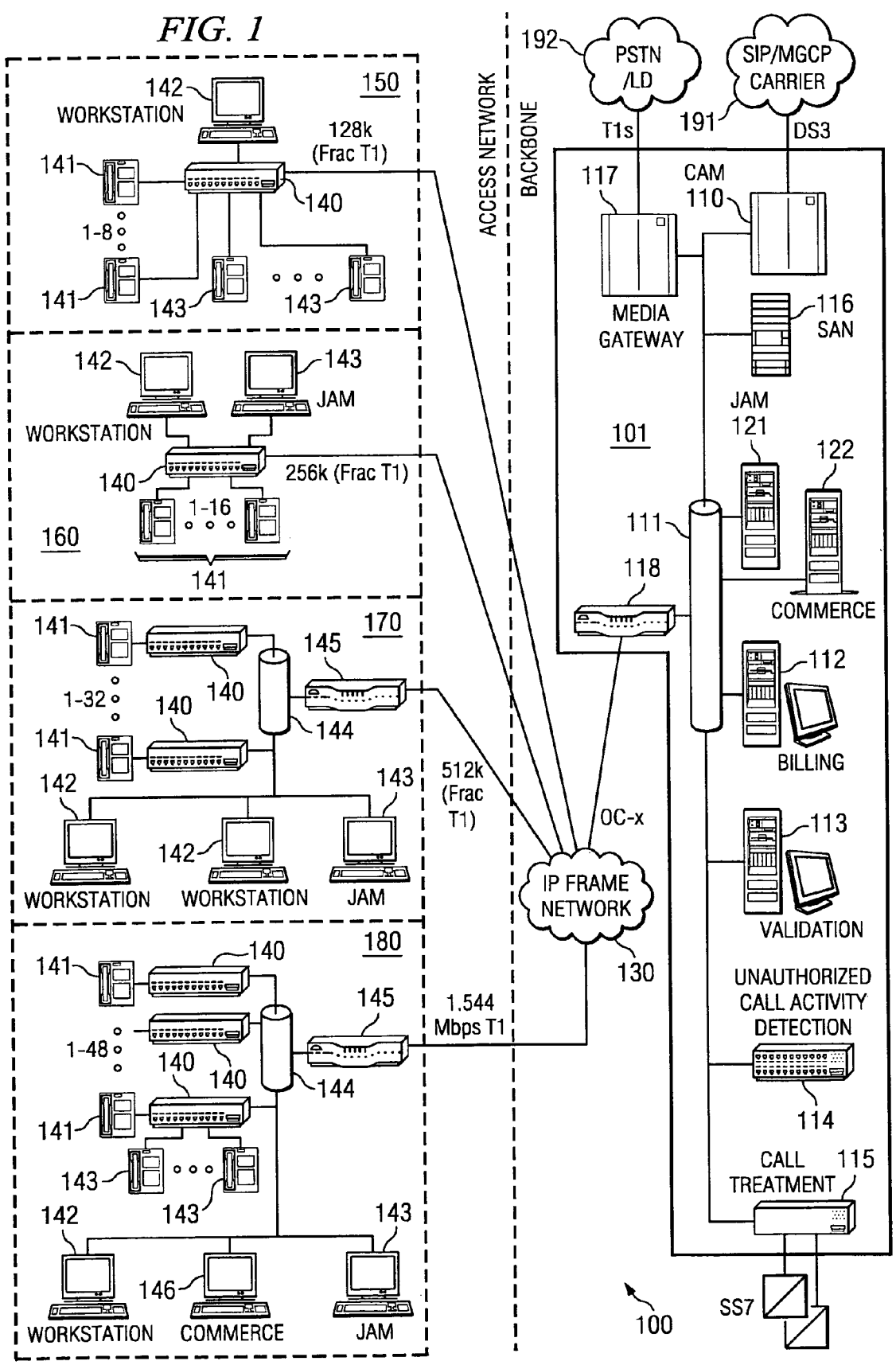
FIG. 1 shows a call processing system implementing a centralized or nodal call processing platform according to an embodiment of the present invention.

Directing attention to FIG. 1, an embodiment of a centralized or nodal call processing system according to the present invention is shown as call processing system 100. Call processing system 100 of the illustrated embodiment includes call processing platform 101 in communication with facilities 150-180 via network 130. It should be appreciated that, although only a single call processing platform is represented in FIG. 1, any number of call processing platforms, perhaps having varied configurations and/or disposed at different geographic locations, may be implemented with respect to a call processing system of the present invention. Likewise, the number and configurations of facilities for which calling services may be provided by a call processing system of the present invention is not limited to that shown in FIG. 1.

To better aid the reader in understanding the concepts of the present invention, call processing system 100 of FIG. 1 is described herein with reference to its configuration and use in providing calling services to jail or prison facilities. However, it should be appreciated that call processing systems of the present invention are not limited to use with respect to such facilities. Embodiments of the present invention may be utilized with respect to any number of controlled environment facilities (e.g., prisons, hospitals, nursing homes, camps, dormitories, and the like) or other locations (e.g., businesses, residences, kiosks, etcetera).

Preferred embodiments of the present invention dispose one or more call processing gateways, shown here as call processing gateways 140, at or near sites for which call processing services are to be provided, here facilities 150-180. Call processing gateways 140 may provide interfacing and arbitration between a number of protocols, signals, and/or interfaces. For example, preferred embodiment call processing gateways 140 provide a plurality of analog telephone line interfaces (e.g., POTS line interfaces) for coupling to a plurality of telephone terminals 141 and providing loop current, dial tone, etcetera thereto. Preferred embodiment call processing gateways 140 further provide at least one WAN interface (e.g., T1 interface) for coupling to a data, e.g., packet switched, network. Call processing gateways 140 of this preferred embodiment provide conversion of analog signals associated with telephone terminals 141 and visitation telephones 143 and digital data packets of the packet switched network to provide a VoIP gateway. Call processing gateways 140 may include additional or alternative interfaces, such as LAN interfaces (e.g., 100 Mbit Ethernet interface), wireless interfaces (e.g., 802.11 interface), etcetera, if desired. Embodiments of the present invention utilize commercially available devices, such as the IAD 2400 series of integrated access devices available from Cisco Systems, Inc., San Jose, Calif., in providing a call processor gateway.

It should be appreciated that communications provided by call processing gateways 140 utilized according to the present invention are not limited to communication between devices implementing different protocols and/or signals. For example, communications between a plurality of telephone terminals disposed within a particular facility, e.g., visitation telephones 143 shown in facilities 150 and 180, may be provided by call processing gateways 140 of the present invention. Although not requiring signal/protocol conversion to facilitate communication between two such similarly configured devices, call processing gateways 140 of the present invention are preferably leveraged to provide such communication arbitration, e.g., analog to VoIP and VoIP to analog functionality, to provide a data stream to call processing platform 101 containing the communication content between such terminals, such as to provide word search and/or call recording as will be described further below.

A plurality of call processing gateways 140 may be disposed with respect to a particular facility, if desired. For example, a plurality of call processing gateways 140 may be coupled to cooperate in providing call processing services using a network, such as network 144. A network router or switch, such as router 145, may be utilized in coupling call processing gateways 140 to call processing platform 101 via network 130. Router 145 of preferred embodiments may provide communication security, such as in the form of firewall protection, if desired. Of course, other components, such as call processing gateway 140, may be configured to provide communication security in addition to or in the alternative to router 145.

A particular configuration and/or number of call processing gateways 140 utilized with respect to any of facilities 150-180 is preferably selected as a function of the facility's configuration. Depending upon the number of telephone terminals 141 to be provided calling services and/or the number of visitation telephones 143 at a particular facility (typical facilities may have from two telephones to approximately 600 telephones phones or more based on the physical size of the location), a configuration of call processing gateways 140 and/or a number of call processing gateways 140 deployed may be selected having more or less analog telephone line interfacing capacity. Similarly, depending upon the communication volume expected to be utilized at a particular facility, a configuration of call processing gateways 140 and/or a number of call processing gateways 140 deployed may be selected providing more or less bandwidth with respect to a WAN interface thereof. Where local management terminals, e.g., workstations 142, or other data processing equipment, e.g., justice application management 143 and/or commerce system 146, is to be provided WAN access at a particular facility, a configuration of call processing gateways 140 may be selected to provide a LAN interface and/or appropriate WAN bandwidth.

The bandwidth of a connection between a particular facility and network 130 provided by a carrier access network may be scaled to correspond to an expected communication volume. For example, where relatively few telephone terminals 141 and/or visitation telephones 143 are present and management terminal or other data processing equipment communication is expected to be relatively low, a lower bandwidth connection (e.g., fraction of T1 or, perhaps in cases where reliability is not an issue, digital subscriber line (DSL) such as asynchronous DSL (ADSL) high bit rate DSL (HDSL) etcetera (referred to collectively as xDSL) or cable modem technology) may be provided. However, where a large number of telephone terminals 141 and/or visitation telephones 143 are present and/or management terminal or other data processing equipment communication is expected to be relatively high, a higher bandwidth connection (e.g., T1 or DS3) may be provided. These data links may be aggregated as they pass through the carrier's access network, thereby providing a larger bandwidth aggregated connection or connections (e.g., OC3 or OCX) from network 130 to call processing platform 101.

The data links between call processing gateways 140 and call processing platform 101 are preferably packet switched links, such as those provided using various IP or frame relay protocols. However, any type of data connectivity protocol that may be relied upon to deliver VoIP and data packets may be utilized according to embodiments of the present invention. Embodiments of the present invention may utilize carrier access network and backbone network links implementing protocols such as Ethernet, asynchronous transfer mode (ATM), synchronous optical network (SONET), and the like.

Call processing platform 101 of the illustrated embodiment includes router/switch 118 coupling network 130 to various systems and components comprising call processing platform 101 via network 111. Router/switch 118 of preferred embodiments may provide communication security, such as in the form of firewall protection, if desired. Of course, other components, such as validation system 113, may be configured to provide communication security in addition to or in the alternative to router/switch 118.

The illustrated embodiment of call processing platform 101 includes a number of functional aspects, ones of which may be omitted in optional configurations, shown as various systems cooperating to provide call processing according to embodiments of the present invention. Call application management system 110, billing system 112, validation system 113, unauthorized call activity detection system 114, call treatment system 115, call recording system 116, and media gateway 117 may be utilized in various combinations to provide primary calling service functionality according to embodiments of the present invention. Justice application management system 121 and/or commerce system 122 of call processing platform 101 may be utilized in providing enhanced functionality as will be described further below. It should be appreciated that, although the illustrated embodiment is described with reference to a justice application management system providing enhanced functionality with reference to use in providing calling services to jail or prison facilities, embodiments of the present invention may implement information management systems useful with respect to a variety of applications, such as hospital management, business management, demographic collection and/or analysis, usage statistics, etcetera. Accordingly, justice application management system 121 as shown in FIG. 1 may correspond to any number of information management systems providing data collection and/or sharing among facilities as described herein.

Call application management system 110 of the preferred embodiment, as may comprise one or more processor-based servers as are well known in the art, forms the heart of call processing functionality provided by call processing platform 101. For example, preferred embodiments of call application management system 110 control completing a call between a party using any one of telephone terminals 141 or visitation telephones 143 and another party, such as may be using one of visitation telephones 143 or a telephone terminal (not shown) coupled to call processing platform 101 via SIP/MGCP network 191 or PSTN 192. Additionally or alternatively, call application management system 110 may include interactive voice response (IVR), text-to-speech, voice recognition, and/or dual tone multi-frequency (DTMF) recognition/generation functionality such as may be useful for playing announcements to various ones of the calling and called parties, soliciting information (such as personal identification numbers (PINs), account numbers, called number, etcetera) from the parties, signaling other systems, etcetera.

Detail with respect to operation in providing call processing by a call application manager according to embodiments of the present invention is shown in the above referenced patent application entitled "Information Management and Movement System and Method." However, call application management system 110 of the embodiment illustrated in FIG. 1 herein provides a data interface coupling call application management system 110 to facilities 150-180 via network 130 and providing VoIP communication therebetween. Additionally, call application management system 110 of FIG. 1 provides a data interface coupling call application management system 110 to user terminals (e.g., telephone terminals, not shown) via SIP/MGCP network 191 and providing VoIP communication through the carrier network to a point more near the user terminal. Accordingly, call application manager 110 of a preferred embodiment need not implement analog voice cards for interfacing with particular user terminals and need not convert between digital and analog signal formats when providing communication between particular users.

Call processing platforms of the present invention are not limited to operation in the digital domain. Accordingly, the illustrated embodiment of call processing platform 101 includes media gateway 117 in communication with call application management system 110 via network 111. Media gateway 117 of a preferred embodiment, as may comprise one or more processor-based servers having analog voice cards as are well known in the art, provides interfacing and arbitration between a number of protocols, signals, and/or interfaces, such as to facilitate communications between digital VoIP protocols present on network 111 and analog protocols present on PSTN 192. Using media gateway 117, call application management system 110 may provide communications to user terminals (e.g., telephone terminals, not shown) via PSTN 192.

However, it should be appreciated that providing communication to a carrier in digital format, such as SIP or MGCP, may provide several advantages. For example, research has revealed that considerable cost advantages with respect to carrying the traffic through the public network may be realized when the communications are provided to the network in a digital format. The cost savings have been found to be significant with respect to interstate and interlata calls, such as on the order of $0.05 to $0.02 per minute. Additionally, issues of latency in processing digitally processed calls may be avoided by providing communication to a carrier in digital format by avoiding repeated conversion between digital and analog formats. Call quality may be improved through the use of digital communication in as much of the communication link as is possible, thereby avoiding signal degradation typically inherent in analog communication networks.

Embodiments of call processing platforms of the present invention are preferably coupled to multiple carriers (whether through POTS links, digital links, etcetera) to allow switching connections to be made by the call processing platform based upon considerations such as least cost routing, rate changes, regulatory issues, reliability issues, and/or the like. Call application management system 110 of one embodiment may make determinations with respect to a particular carrier network to utilize in connecting a calling party to a called party on a call by call basis or in response to a particular event. Preferred embodiments of the present invention provide the ability to switch quickly between available carriers in response to an event, such as a service disruption or rate change. In contrast, distributed call processing system architectures typically require a long period of coordination, physical dispatch, and often the implementation of different hardware to facilitate a switch between particular carriers providing calling connections.

Additionally or alternatively, call application management system 110 may cooperate with other systems to provide robust call processing functionality. For example, call application management system 110 may cooperate with validation system 113 and/or unauthorized call activity detection system 114 to provide call intelligence for use in determinations with respect to allowing a particular call to be continued. According to one embodiment, unauthorized call activity detection system 114 provides real-time intelligence with respect to fraudulent or otherwise unauthorized activity being attempted during a call. For example, unauthorized call activity detection system 114 may employ silence detection techniques to identify attempts at establishing an unauthorized three-way call. Detail with respect to detecting unauthorized call activity is provided in the above referenced patent applications entitled "Three-Way Telephone Call Prevention System and Method" and "System and Method for Detecting Unauthorized Call Activity."

Call recording system 116 of the illustrated embodiment, as may comprise a SAN providing large amounts of data storage (e.g., terabytes), is coupled to call application management system 110 and operates under control thereof to store information with respect to calls. Information stored by call recording system 116 may comprise the content of the call, i.e., record the conversation or exchange of data provided by the call. Additionally or alternatively, information stored by call recording system 116 may comprise ancillary call information, such as identification of the calling and/or called party, calling number (e.g., automatic number information (ANI)), called number (e.g., dialed number information service (DNIS)), time of call, duration of call, account information, entity responsible for billing the call, and/or the like. Although the content of a call may be recorded in an analog format, preferred embodiments of the present invention record the content in a digital format to readily facilitate retrieval and/or playback via digital means, such as upon workstations 142 via network 130.

According to embodiments of the invention, call application management system 110 may signal call recording system 116 to record or not record particular calls processed by call processing platform 101. For example, all calls placed from any of facilities 150-180 to any party except an attorney representing a party to the call may be recorded by call recording system 116. It should be appreciated that, as the content of the call is provided in digital form, packets may readily be routed not only between a call processing gateway 140 and call application management system 110 for placing parties in communication, but also between call processing gateway 140, call application management system 110, or router 118 and call recording system 116 for archiving the content of the call.

Call processing gateways 140 of embodiments of the invention provide digital data streams including the content of calls not necessarily processed by call processing platform 101 to facilitate recording of those calls by call recording system 116. For example, although call application management system 110 may not be involved in a particular call between visitation telephones 143 of a facility, except perhaps to initially allow the connection and/or establish a time limit or other parameters for the connection, a data stream containing the content of the call may continue to be provided from a call processing gateway 140 to call processing platform 101 to facilitate archiving of the call content by call recording system 116.

It should be appreciated that disposing call recording system 116 at the centralized location associated with call processing platform 101 according to preferred embodiment provides several advantages. For example, infrastructure, such as the aforementioned SAN, which otherwise would be cost prohibitive to deploy with respect to a facility may be utilized in an optimized fashion. Moreover, individual facilities need not implement backup procedures for the archiving of recorded calls, thereby not only avoiding the administrative burden but quite likely avoiding the need for additional information technology personnel.

Call recording system 116 of embodiments of the present invention may provide functionality in addition to or in the alternative to archiving call content. For example, call recording system 116 may comprise processor-based functionality to analyze the content of calls for investigative or other purposes, such as to recognize particular words and phrases. Such word search functionality may cooperate with investigative functionality, as may be provided by justice application management system 121, to alert investigators of a potential threat associated with a caller's utterance of words such as "kill," "bomb," or particular names such as that of a victim or judge. Further detail with respect to investigative uses of such word search functionality as well as investigative functionality which may be provided using a call processor is shown in the above referenced patent application entitled "Information Management and Movement System and Method."

Validation system 113, as may comprise one or more processor-based servers as are well known in the art, may operate to make determinations with respect to allowing a particular call to be completed and/or continued. For example, validation system 113 may cooperate with call application management system 110 when a call is initiated to verify the identity of the calling party, that the calling party is authorized to place a call, that the called party will receive calls or is authorized to receive calls from the calling party, that the calling party and/or called party have not exceeded a particular velocity of calls or a preselected value point (e.g., billing limit), that an identified prepaid account has sufficient monies to fund the call, that, in the case of a collect call, a billing arrangement exists between an entity responsible for billing calls to the called party and the service provider and that the called party presents an acceptable collection risk, etcetera. Detail with respect to call validation functionality is provided in the above referenced patent applications entitled "Information Management and Movement System and Method," "Optimizing Profitability in Business Transactions," "System and Methods for Offering a Service to a Party Associated with a Blocked Call," and "Systems and Methods for Transaction Authorization Determination."

It should be appreciated that the validation process as provided by validation system 113 of a preferred embodiment provides improved validation determination response as compared to a typical distributed validation scheme. For example, where a distributed architecture is utilized, validation often requires a call processor local to the calling party to establish a link with one or more centralized clearing houses or other databases to perform a validation. However, the centralized configuration of the call processing architecture of FIG. 1 provides for communication between application management system 110 and validation system 113 locally, using packet transmissions, thereby facilitating improved validation determination responsiveness.

Additionally or alternatively, validation system 113 may cooperate with other systems to provide enhanced call validation. For example, validation system 113 may cooperate with call treatment system 115 to provide call intelligence for use in the aforementioned determinations with respect to allowing a particular call to be completed and/or continued. Accordingly, robust information, perhaps including information harvested from a signaling network, such as the signaling system 7 (SS7) network, may be utilized in call processing by call processing platform 101 of a preferred embodiment. For example, determinations with respect to a call forwarding feature being activated for a called number may be made from information available from SS7 data and, thus, validation system 113 may utilize this information in a determination as to whether the call should be completed. Detail with respect to use of call intelligence for use in making determinations with respect to the treatment of calls is shown in the above referenced patent application entitled "System and Method for Call Treatment."

Additionally or alternatively, validation system 113 may cooperate with other systems of call processing system 100 to provide robust call processing functionality. For example, when identifying a call going to a certain telephone number, rather than blocking the call attempt, validation system 113 may cooperate with justice application management system 121 to notify an investigator that a call was made to that telephone number and/or to forward the call content for monitoring purposes to an investigator's telephone (e.g., cell phone or office phone) number. Detail with respect to such intelligence functionality is provided in the above referenced patent application entitled "Information Management and Movement System and Method."

Billing system 112, as may comprise one or more processor-based servers as are well known in the art, may operate to provide accounting, billing, and/or reconciliation of charges for calling and other services provided by call processing system 100. For example, billing system 112 may cooperate with call application management system 110 to collect billing information with respect to calls processed by call processing platform 101. This information may be used in real-time to deduct monies from prepaid accounts associated with a party to the call, to compile call detail records for out-clearing to local exchange carriers providing service to a called party, to provide direct billing by the service provider, etcetera. Detail with respect to accounting, billing, and reconciliation functionality is provided in the above referenced patent applications entitled "Information Management and Movement System and Method," "System and Method for Reverse Billing of a Telephone Call," "Method for Determining an Entity Responsible for Billing a Called Party," and "Method and Apparatus for Exchanging Data Between a Primary Computer System and an External Computer System to Ensure Transaction Reconciliation Between the Systems."

Additionally or alternatively, billing system 112 may cooperate with other systems to provide robust call processing functionality. For example, billing system 112 may cooperate with validation system 113 to provide billing information or portions thereof for use in the aforementioned determinations with respect to allowing a particular call to be completed and/or continued. As a specific example, debit card amounts may be debited real time by billing system 112 and the debit card threshold monitored by validation system 113 to shut off a call immediately upon crossing the debit card threshold. Accordingly, real-time, dynamic control of call processing services may be provided by embodiments of the present invention without the delay associated with periodic polling of distributed and/or discrete systems.

Billing system 112 of embodiments of the present invention implements various functionality to facilitate the performance of revenue producing services and/or to optimize the amounts of revenues and/or profits attained. For example, billing system 112 may cooperate with validation system 113 and/or call application management system 110 to solicit funds from a party or create a prepaid account when a collection risk is determined to be unacceptably high or monies are not otherwise available to fund a call. Accordingly, embodiments of the present invention provide the ability to set up a call account real-time, e.g., when a caller picks up a telephone terminal in a served facility but has not already established a way to bill the call. Detail with respect to such functionality is shown in the above referenced patent application entitled "System and Method for Account Establishment and Transaction Management Using Interrupt Messaging."

Billing system 112 may additionally or alternatively provide intelligent management of accounts receivable, such as to hold out-clearing of call detail records to local exchange carriers to consolidate call charges on billing statements, to maintain visibility and control with respect to accounts, to allow flexibility in account collection, etcetera. Detail with respect to intelligent account management functionality is shown in the above referenced patent application entitled "Intelligent Queuing of Transaction Requests."

It should be appreciated that, because call processing platform 101 of the preferred embodiment provides call processing with respect to a plurality of facilities, embodiments of the present invention include the capability to segment the data being stored in relation to each facility. For example, all of the calling records, all the call recordings, system parameters and configuration settings, etcetera may be tagged or otherwise associated with the facility to which it belongs. Using such information, call processing system 100 of a preferred embodiment is able to control access to the data when a user logs onto the central data from a facility, based on their logon ID information, where they are logging in from, or other information. A user logging on from a particular facility may be provided only information associated with that facility for which their logon ID provides them access. For example, a user at workstation 142 at facility 180 may be provided access to play recorded calls made from facility 180, provided that user's logon ID permits such activity. Similarly, a user at workstation 142 at facility 160 may be allowed to change configuration settings, such as preselected value points establishing billing limits, blocked telephone numbers, etcetera, affecting operation of call processing platform 101 with respect to facility 160, provided that user's logon ID permits such activity. Of course, using appropriate security protocols, users are not limited to data access to the call processing platform from terminals disposed at the various facilities and, therefore, may access aspects of the systems from other remote locations.

It should be appreciated that a virtual local facility call processor system is provided using the aforementioned management terminals disposed locally at a facility and coupled to the centralized call processing platform via a data connection. Accordingly, a facility can enjoy the benefits of having a call processor system without the full expense of such systems. For example, in the illustrated embodiment, a facility may have only a few telephone terminals, a general purpose computer system for use as a management terminal, and a data network connection coupled to a call processing gateway in order to receive the benefits of a full featured call processing system of the present invention. Expansion and updating of such a call processing system with respect to each facility is highly simplified as most updates and expansions may be accomplished centrally, at the call processing platform, without direct involvement of the facility or its personnel. Where the facility or its personnel are involved in an expansion or update, such as to increase communication capacity, the level of such involvement is expected to be insubstantial, such as to deploy additional call processing gateways, connect additional telephone terminals thereto, and provide a network connection.

Moreover, the centralized configuration of call processing platforms of embodiments of the present invention may be utilized to provide additional advantages. For example, data associated with a plurality of facilities may be made available for sharing, aggregation, and/or analysis. According to one embodiment, particular facilities, such as facilities within a same county or state are provided shared data access to collect intelligence, to improve facility management, to minimize administrative burden, etcetera. As one specific example of data sharing between facilities, assume that facility 150 corresponds to a local police department and that facility 170 corresponds to a county prison facility to which prisoners of the police department are transferred when incarcerated for extended periods of time. Booking in an inmate into the jail at the local police department of facility 150 enters the inmate information into a justice application management database coupled to call processing platform 101, such as within justice application management system 121. That inmate may be uniquely coded, such as by assigning a inmate number or using otherwise unique information (e.g., social security number), and might even be given a machine readable version of the unique code (e.g., a barcoded wristband). When transferred from the jail at the local police department of facility 150 to the county prison of facility 170, the inmate's unique code (such as might be scanned from the aforementioned barcoded wristband) may be utilized to populate a database entry of facility 170, such as within justice application management system 121 of call processing platform 101 and/or justice application management system 143 of facility 170. Accordingly, the administrative time associated with soliciting and entering such information is foregone, as well as the added opportunity for data entry error avoided.

It should be appreciated that access to data made available by call processing systems of the present invention is not limited to data connections from a facility site, such as WAN connections from workstations 142 to call processing platform 101. For example, access to such data may be provided via an application service provider (ASP) type configuration, such as may be provided via the Internet. An ASP hosting site may be collocated with other functional aspects of a call processing platform of the present invention or could be hosted at other locations, such as using WAN connections to a call processing platform.

Advantages in the sharing, aggregation, and/or analysis of data extends beyond the situation where associated or otherwise affiliated facilities share data. Where a large number of facilities are coupled to a centralized call processing system of the present invention, such data sharing, aggregation, and/or analysis provides appreciable advantages in conducting homeland security. For example, an appreciable amount of homeland security intelligence may be gleaned from data derived from all of the inmates and all of the facilities, such as all of their calling records, all of their calling patterns, all of their call recordings, etcetera, which might be scrubbed and parsed to find patterns indicative of particular activities.

It should be appreciated that additional advantages of embodiments of a centralized call processing system are exemplified in the foregoing example. Enhanced features may be provided with respect to a facility which might not otherwise have the funding or work load to fully justify the expense for the corresponding infrastructure. For example, justice application management, which may comprise a back office software product for a jail to facilitate management of the inmates in the facility (e.g., what cells they are assigned to, what medications are to be administered to them, tracking their medical records, tracking their privileges, etcetera), management of facility personnel (e.g., scheduling working hours, tracking vacation days, administering benefits, etcetera), management of facility resources (e.g., scheduling use of vehicles and conference rooms, establishing telephone availability schedules, etcetera), and/or providing intelligence functionality (e.g., investigative analysis of call and money flow data, analyzing call and commerce transaction velocity, etcetera), may be highly desirable to all of facilities 150-180 but economically out of reach of all but the largest of these facilities. However, because a plurality of facilities are served, infrastructure costs may be spread across a number of such facilities to make it practical to provide such enhanced features to any or all facilities.

Moreover, although larger facilities are free to take advantage of such shared infrastructure, embodiments of the present invention accommodate distributed deployment of such infrastructure, such as where a facility has a legacy system in place or where a facility has a sufficient work load to justify local deployment of particular infrastructure. In the case where justice application management system 143 is disposed locally with respect to a facility, embodiments of the present invention may provide backhauling of data to the centralized call processing platform for backup purposes, for centralized storage, for sharing, etcetera. Additionally or alternatively, the data network provided by call processing system 100 may be utilized to link two or more justice application management systems 143 for sharing of data between facilities. The data connections via network 130 of the illustrated embodiment facilitate sharing of data in any of the foregoing configurations.

Enhanced functionality provided by embodiments of centralized call processing systems of the present invention is not limited to the aforementioned justice application management functionality. For example, in addition to or in the alternative to justice application management system 121 disposed at a call processing platform of the present invention, commerce system 122 may be disposed at a call processing platform to provide various commerce functions. For example, inmates or other residents of facilities 150-180 may utilize telephone terminals 141 to place commissary orders, such as for candy bars, cigarettes, bed sheets, toiletries, etcetera. By bringing all this data back to a central site, embodiments of the present invention enable a commissary company to readily deploy commissary functionality with respect to a number of facilities which might not otherwise be economically feasible to do so. Moreover, commissary data with respect the various facilities may be aggregated for electronic delivery to the commissary company, without the commissary company having to deal with placing commissary systems at every facility to collect this data. Of course, as with the justice application management functionality discussed above, where such functionality is provided locally with respect to a facility, such as by commerce systems 146, the data links of the present invention facilitate operation therewith.

It should be appreciated that the use of resources in addition to the aforementioned call application management system, call recording system, justice application management system, and commerce system may be optimized by embodiments of the present invention. For example, customer service agents (not shown) may be provided with respect to call processing platform 101 to provide such services as account establishment, call assistance, etcetera, even where call volume associated with any one of facilities 150-180 is insufficient to economically support such personnel.

Similarly, the use of communication lines may be optimized using a centralized configuration of the present invention. For example, where discrete call processing systems are deployed with respect to facilities, it may be necessary to purchase telephone lines on the order of one to every two or three telephone terminals provided at the facility. However, centralized configurations of the present invention are expected to allow improved telephone trunking such that telephone lines on the order of one to every four or five telephone terminals served at the facilities by the call processing platform will be sufficient. Such efficiencies in telephone trunking may be achieved because each of the facilities is unlikely to be experiencing similar calling demand simultaneously. For example, the call processing system may provide services to facilities in different time zones, allowing one facility to utilize telephone lines at a time another facility is not using the telephone lines. Additionally, some facilities may be experiencing periods of exceptionally low telephone utilization, such as during lock-down, allowing the system to readily accommodate other facilities experiencing periods of exceptionally high telephone utilization, such as associated with a facility providing unusually numerous break periods to inmates. The variations in calling across all of the facilities allows centralized call processing systems of the present invention to optimize utilization of bandwidth.

It should be appreciated that the aforementioned trunking of resources at the call processing platform substantially mitigates capacity limitations with respect to each particular facility. For example, rather than being limited at any one instant to processing a number of calls equal to the individual telephone lines (or telephone line equivalents) purchased with respect to a particular facility, embodiments of the present invention will allow processing of a number of calls equal to the number of telephone terminals at a particular facility. Such instantaneous peak capacities may be accommodated in part by embodiments of the present invention taking advantage of the fact that digital communication, e.g., VoIP, allows aggregating calls into less bandwidth as well as taking advantage of the optimized utilization of bandwidth as discussed above.

Having described embodiments of the various aspects of a call processing system of the present invention above, reference will now be made to FIG. 2 wherein a flow diagram of operation of such a call processing system in providing calling services according to an embodiment is shown. Operation according to the flow diagram illustrated in FIG. 2 begins at step 201 were a calling party places a telephone terminal, such as one of telephone terminals 141, in an off hook condition. At step 202, a call processing gateway, such as one of call processing gateways 140, coupled to the telephone terminal establishes a link between the telephone terminal and a centralized call processing platform of the present invention, such as call processing platform 101. The link between the telephone terminal and call processing platform may be established by call processing gateway providing loop current to the telephone terminal and beginning a VoIP packet flow directed to an IP address associated with the call processing platform via a packet network, such as network 130.

At step 203 of the illustrated flow diagram, the call processing platform interacts with the calling party and collects call data, such as by utilizing IVR functionality of call application management system 110. The aforementioned interaction with the calling party may comprise soliciting calling party identification information and/or presenting menu options, such as may allow selection of placing an outbound call, ordering commissary items, and checking an account balance. These menu selections may present further queries based upon the menu selection made. For example, when the calling party selects placing an outbound call, the call application management system may solicit a number to be called and a desired payment method (e.g., prepaid account, postpaid account, collect call, etcetera).

Assuming outbound calling services are desired, the illustrated flow diagram proceeds to step 204 wherein the call application management system interacts with the validation system to determine call treatment. For example, validation system 113 may analyze calling party identification information to verify that the party has outbound calling privileges at the present time. Additionally or alternatively, validation system 113 may analyze the number to be called to verify that calls are allowed to be placed to that number. Validation system 113 may further analyze the desired payment method, perhaps interacting with call treatment system 115 and/or billing system 112, to determine if sufficient funds are available to allow the call and/or to determine if an acceptable risk with respect to collecting monies is associated with the desired payment method.

A determination is made at step 205 with respect to whether the call is authorized based upon information provided by the validation system. If the call is determined not to be authorized at step 205, processing according to the illustrated embodiment proceeds to step 206 wherein the call application management system does not connect the call, perhaps playing a message to the calling party stating the reason(s) the call will not be completed. However, if the call is determined to be authorized at step 205, processing according to the illustrated embodiment proceeds to step 207 wherein the call application management system connects the call.

It should be appreciated that processing of the call according to embodiments of the invention to this point in the illustrated flow diagram has been in the digital domain, with the exception of the link between the telephone terminal and the call processing gateway. Preferred embodiments of the present invention provide connection of the call to a carrier network, such as SIP/MGCP network 191, in digital format. However, embodiments of the present invention may provide connection of the call to a carrier network, such as PSTN 192, in analog format, such as by call application management system 110 cooperating with media gateway 117 to connect the call.

There is no limitation according to the present invention that connection to a carrier network being provided at the centralized location of the call processing platform. For example, a caller in a particular facility may place a call to a called party which is local to the facility, whereas the centralized location is not. In such a situation, call application management system 110 of an embodiment of the present invention may implement the call connection by "hairpinning" the call content data (e.g., VoIP data packets) back through network 130 to the call processing gateway 140 of the particular facility and controlling call processing gateway 140 to connect the data stream to an interface coupled to a local carrier line, where such a line has been provided. Even where such local carrier connections are supported, embodiments of the present invention continue to provide call content data streams from the call processing gateway to the call processing platform, such as for recording of the call by call recording system 116, accounting for the call by billing system 112, and/or real-time monitoring of the call by call application management system 110, unauthorized call activity detection system 114, and/or word search functionality of call recording system 116.

It should be appreciated that the aforementioned redirection of the call content data stream for local carrier connection at a facility is not limited to redirection at the facility at which the calling party is located. For example, it may be determined that, although a called party is not local to the call processing platform, the called party is local to a facility of the call processing system other than that associated with the calling party. Accordingly, where that facility supports local carrier connections, a call application management system of the present invention may redirect the call content data flow for local connection by that facility.

Although it may appear at first impression that connection of call content data streams to carrier networks at a centralized location such as that associated with call processing platform 101 may unnecessarily incur long distance and other toll charges, research has revealed that contrary to such conventional thoughts significant savings may be had through an embodiment employing centralized carrier connection. In a typical scenario, one may expect to pay approximately $0.05 per minute for intralata calling and from approximately $0.02 to $0.03 per minute for interstate calling where significant call volume is present. Also typically, one may expect to pay no per minute charges for interlata calling, although a monthly line charge will be incurred for having line availability. In contrast, however, research has revealed that intralata and interstate calling may be provided for per minute charges on the order of $0.01 when calls are delivered to the carrier network in digital format (e.g., SIP), which presents a significant savings over the above interlata call charges and appreciable savings over the above interstate call charges. Accordingly, even where calls local to a facility and would not otherwise experience a per minute charge, embodiments of the present invention are expected to provide economic savings by backhauling the call to a centralized location for connection to a carrier network. These economic advantages are further expected to be enhanced through the optimization of bandwidth, as discussed above, allowing a reduced number of total lines to be purchased, thereby lowering the monthly line charges to the service provider.

Figure 2:
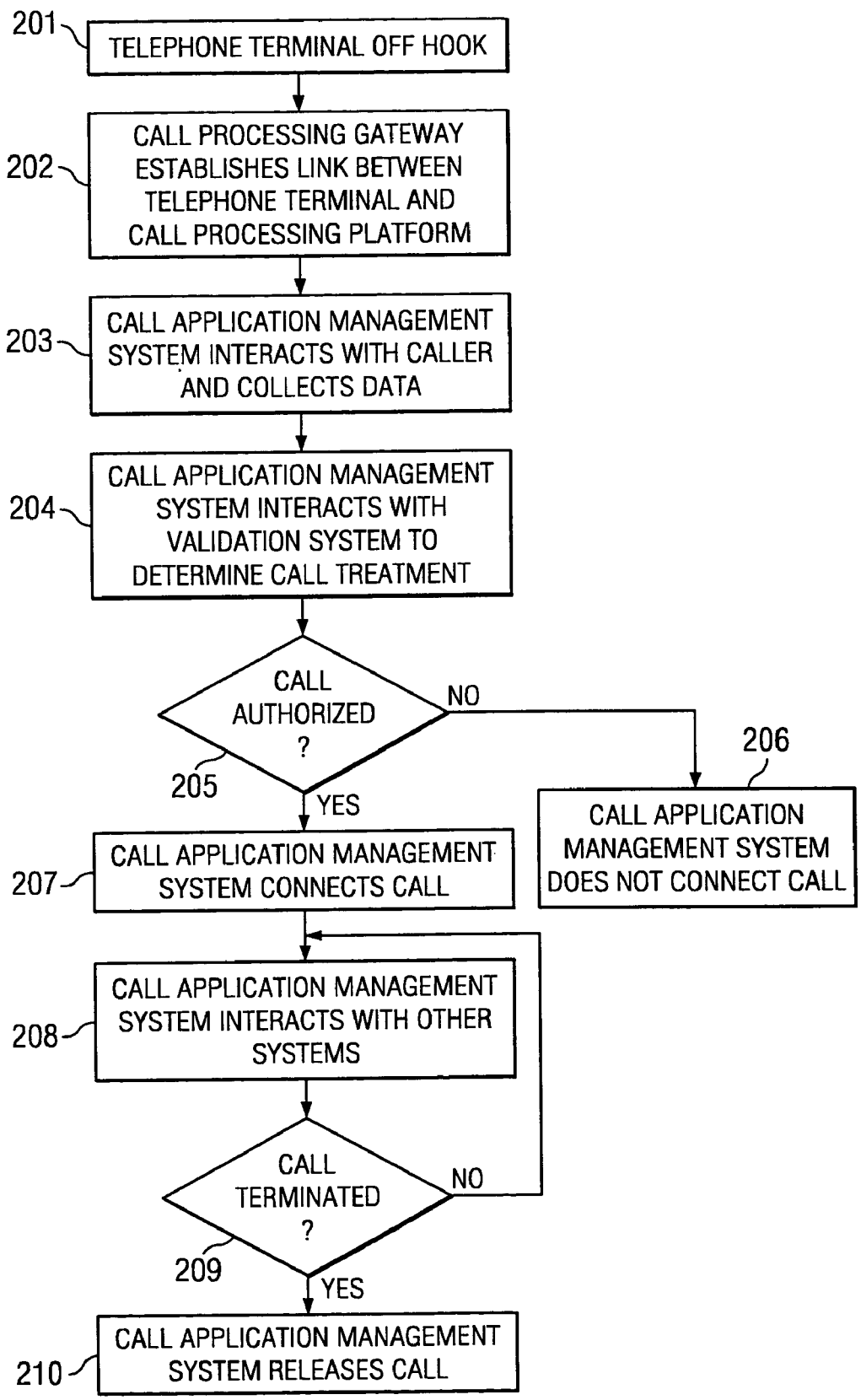
FIG. 2 shows a flow diagram of operation of the call processing system of FIG. 1 according an embodiment of the present invention.

Continuing with the flow diagram illustrated in FIG. 2, after connecting a call at step 207, the call application management system interacts with other systems of the call processing platform in providing a continued connection at step 208. For example, call application management system 110 may signal call recording system 116 to record the call content. Additionally or alternatively, call application management system 110 may cooperate with unauthorized call activity detection system 114 to ensure that a calling or called party does not implement an unauthorized calling feature, such as three-way calling, during the call.

At step 209 a determination is made as to whether the call is terminated. For example, call application management system 110 may determine that an attempt has been made to implement an unauthorized calling feature and therefore may terminate the call. Similarly, call application management system 110 may determine that a call time limit or account balance has expired and therefore may terminate the call. Alternatively, either of the calling or called parties may terminate the call. If it is determined that the call has not been terminated at step 209, the illustrated embodiment returns to step 208 for the call application management system to continue interaction with other systems of the call processing platform in providing a continued connection. However, if it is determined that the call has been terminated at step 209, processing according to the illustrated embodiment proceeds to step 210 wherein the call application management system releases the call.

Although embodiments herein have been described with reference to telephone terminals, it should be appreciated that the present invention is not limited to use with respect to any particular type of user device. For example, video phones, multi-media computers, cellular phones, personal digital assistants (PDAs), and the like may be coupled to a call processing platform of the present invention for providing call processing services, if desired.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A centralized call processing system for providing call processing services to a plurality of prison facilities, comprising:

a networking device connected via digital data links to call processing gateways at the plurality of prison facilities to collect outgoing Voice over Internet Protocol (VoIP) data packets associated with calls from the plurality of prison facilities and to distribute incoming VoIP data packets associated with the calls to the plurality of prison facilities, the plurality of prison facilities located remotely from the call processing gateways, each of the plurality of prison facilities including at least one telephone terminal;

an unauthorized call activity detection system co-located with the networking device and connected to the networking device for detecting three-way call activity associated with the calls placed from one or more of the plurality of telephone terminals, the three-way call activity detection not performed at the plurality of the prison facilities;

a call application management system co-located with the networking device and connected to the networking device and the unauthorized call activity detection system for at least processing the outgoing VoIP data packets from the plurality of prison facilities into outgoing call signals and transmitting the outgoing call signals to a first telephone carrier network, the call application management system receiving incoming call signals from the first telephone carrier network and processing the incoming call signals into the incoming VoIP data packets for distribution to the plurality of prison facilities by the networking device; and a billing system co-located with said call application management system and located remotely from the call processing gateways, the billing system connected to the call application management system for providing accounting of the calls.

2. The system of claim 1, wherein said call processing gateways comprise voice over Internet protocol gateways.

3. The system of claim 1, wherein each of said call processing gateways provide at least one local area network interface for coupling with a computer workstation.

4. The system of claim 1, wherein said call application management system communicates with said first telephone carrier network using digital data packets.

5. The system of claim 1 further comprising a media gateway connected to the networking device for placing said calls on said first telephone carrier network using analog signals.

6. The system of claim 1 further comprising a call recording system connected to said call application management system for recording the calls.

7. The system of claim 1 further comprising a validation system co-located with said call application management system and located remotely from the call processing gateways, the validation system connected to said call application management system for authorizing connecting of said calls to said first telephone carrier network.

8. The system of claim 1 further comprising:

a justice application management system connected to the networking device for managing inmates at the plurality of prison facilities; and a commerce system for managing commissary orders placed by the inmates at the plurality of prison facilities.

9. The system of claim 7 further comprising a call treatment system co-located with said call application management system and located remotely from the call processing gateways, the call treatment system connected to the validation system for communicating with a signaling network of said first telephone carrier network to determine whether a call forwarding feature is activated for call numbers associated with the calls.

10. The system of claim 8 wherein said justice application management system further provides investigative information with respect to said calls.

11. The system of claim 1 further includes interactive voice response functionality for providing messaging associated with processing of the calls.

12. The system of claim 1, wherein said first carrier network comprises a SIP (Session Initiation Protocol) carrier.

13. The system of claim 1, wherein said first carrier network comprises a MGCP (Media Gateway Control Protocol) carrier.

14. The system of claim 1, wherein said first carrier network comprises the PSTN (Public Switched Telephone Network).

15. The system of claim 1, wherein the call application management system is further configured to process and transmit outgoing call signals from the plurality of telephone terminals to a second telephone carrier network, the call application management system selecting either the first telephone carrier network or the second telephone carrier network to transmit the call signals.

16. The system of claim 15, wherein the call application management system establishes connection for the calls over the first telephone carrier network and switches to connection over the second telephone carrier network responsive to detecting a predetermined event.

17. A method for processing calls for a plurality of prison facilities, the method comprising:

a call processing system at a location collecting outgoing Voice over Internet Protocol (VoIP) data packets associated with calls from the plurality of prison facilities via digital data links, the plurality of prison facilities located remotely from the call processing system, each of the plurality of prison facilities including at least one telephone terminal;

the call processing system processing the outgoing VoIP data packets from the plurality of prison facilities into call signals for transmission over a telephone carrier network;

the call processing system processing incoming call signals from the telephone carrier network into incoming VoIP data packets;

the call processing system detecting unauthorized three-way call activity associated with the calls, the plurality of prison facilities not detecting the unauthorized three-way call activity;

the call processing system distributing the incoming VoIP data packets associated with the calls to the plurality of prison facilities via the digital data links; and the call processing system performing billing operations associated with the calls.

18. The method of claim 17, further comprising:

coupling said call processing system to the telephone carrier network via an analog interface.

19. The method of claim 17, further comprising:

coupling said call processing system to the telephone carrier network via a digital interface.

20. The method of claim 17, further comprising:

recording the calls from the plurality of telephone terminals; and analyzing content of the calls for particular utterances to determine presence of threats in the calls.

21. The method of claim 17, further comprising:

selecting one telephone carrier network among a plurality of telephone carrier networks connected to the call processing system for processing and transmission of the calls responsive to receiving the calls from the plurality of telephone terminals.

* * * * *

UNITED STATES PATENT AND TRADEMARK OFFICE
CERTIFICATE OF CORRECTION

| | | |
|---|---|---|
| PATENT NO. | : 7,899,167 B1 | Page 1 of 1 |
| APPLICATION NO. | : 10/642532 | |
| DATED | : March 1, 2011 | |
| INVENTOR(S) | : Robert L. Rae et al. | |

It is certified that error appears in the above-identified patent and that said Letters Patent is hereby corrected as shown below:

In claim 1, Column 19, Line 1, replace "gateways" with --system--.

Signed and Sealed this
Twenty-ninth Day of November, 2011

David J. Kappos
*Director of the United States Patent and Trademark Office*